US007458061B2

(12) United States Patent
Bracha

(10) Patent No.: US 7,458,061 B2
(45) Date of Patent: Nov. 25, 2008

(54) PROTECTING OBJECT IDENTITY IN A LANGUAGE WITH BUILT-IN SYNCHRONIZATION OBJECTS

(75) Inventor: Gilad Bracha, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 869 days.

(21) Appl. No.: 10/459,363

(22) Filed: Jun. 12, 2003

(65) Prior Publication Data

US 2004/0039746 A1 Feb. 26, 2004

(51) Int. Cl.
*G06F 9/44* (2006.01)
(52) U.S. Cl. ........................ 717/116; 719/312
(58) Field of Classification Search ............ 717/108, 717/116; 719/312, 316, 328, 315
See application file for complete search history.

(56) References Cited

U.S. PATENT DOCUMENTS

| | | | | |
|---|---|---|---|---|
| 5,202,672 A * | 4/1993 | Nakamura et al. | ........... | 345/467 |
| 5,247,305 A * | 9/1993 | Hirata et al. | ................... | 342/44 |
| 5,525,991 A * | 6/1996 | Nagura et al. | ............ | 340/10.51 |
| 5,615,362 A * | 3/1997 | Jensen et al. | ............ | 707/103 R |
| 5,631,642 A * | 5/1997 | Brockelsby et al. | ......... | 340/993 |
| 5,706,506 A * | 1/1998 | Jensen et al. | ............ | 707/103 R |
| 5,717,919 A * | 2/1998 | Kodavalla et al. | .............. | 707/8 |
| 5,825,299 A * | 10/1998 | Fuentes et al. | ........... | 340/10.42 |
| 5,826,268 A * | 10/1998 | Schaefer et al. | ................ | 707/9 |
| 5,848,232 A * | 12/1998 | Lermuzeaux et al. | ......... | 726/21 |
| 6,026,401 A * | 2/2000 | Brealey et al. | ................. | 707/8 |
| 6,058,209 A * | 5/2000 | Vaidyanathan et al. | ...... | 382/203 |
| 6,134,627 A | 10/2000 | Bak | ............... | 711/6 |
| 6,167,424 A | 12/2000 | Bak et al. | ................... | 709/100 |
| 6,173,404 B1 * | 1/2001 | Colburn et al. | ................ | 726/17 |
| 6,173,442 B1 * | 1/2001 | Agesen et al. | .............. | 717/141 |
| 6,195,791 B1 * | 2/2001 | Carlson et al. | ............. | 717/100 |
| 6,212,608 B1 | 4/2001 | Bak | ........................... | 711/152 |
| 6,247,025 B1 * | 6/2001 | Bacon | ........................ | 707/206 |
| 6,256,783 B1 * | 7/2001 | Wada et al. | ................. | 717/154 |
| 6,262,664 B1 * | 7/2001 | Maloney | ................. | 340/572.8 |
| 6,275,979 B1 * | 8/2001 | Graser et al. | ................ | 717/100 |
| 6,295,640 B1 * | 9/2001 | Eidt | ........................... | 717/101 |
| 6,314,563 B1 * | 11/2001 | Agesen et al. | .............. | 717/108 |
| 6,327,533 B1 * | 12/2001 | Chou | ......................... | 701/207 |
| 6,342,837 B1 * | 1/2002 | Lai et al. | ................. | 340/572.1 |
| 6,345,313 B1 * | 2/2002 | Lindholm | ................... | 719/315 |

(Continued)

OTHER PUBLICATIONS

"Do Not Reassign The Object Reference of a Locked Object", Peter Haggar, IBM, Oct. 1, 200, 3 pages.*

(Continued)

*Primary Examiner*—Todd Ingberg
(74) *Attorney, Agent, or Firm*—Sonnenschein, Nath & Rosenthal LLP

(57) ABSTRACT

Methods and systems for protecting object identity in an object-oriented programming language. An object from a class for protecting object identity is instantiated in memory. The object includes a first method that determines whether two object values are equal, and a second method that overrides an identity method associated with a superclass of the object by invoking the first method, the identity method for determining the identity of two objects. The object is immediately locked in response to the instantiating, so that the identity of the locked object is protected from threads that attempt to synchronize on the locked object.

43 Claims, 9 Drawing Sheets

U.S. PATENT DOCUMENTS

| | | | |
|---|---|---|---|
| 6,349,322 B1 * | 2/2002 | Shaylor | 718/107 |
| 6,362,737 B1 * | 3/2002 | Rodgers et al. | 340/572.1 |
| 6,405,209 B2 * | 6/2002 | Obendorf | 707/103 R |
| 6,408,311 B1 * | 6/2002 | Baisley et al. | 707/203 |
| 6,442,570 B1 * | 8/2002 | Wu | 707/201 |
| 6,442,748 B1 * | 8/2002 | Bowman-Amuah | 717/108 |
| 6,449,607 B1 * | 9/2002 | Tomita et al. | 707/3 |
| 6,457,023 B1 * | 9/2002 | Pinter et al. | 707/206 |
| 6,487,607 B1 * | 11/2002 | Wollrath et al. | 719/330 |
| 6,526,455 B1 * | 2/2003 | Kamimura | 719/316 |
| 6,529,948 B1 * | 3/2003 | Bowman-Amuah | 709/217 |
| 6,539,396 B1 * | 3/2003 | Bowman-Amuah | 707/103 R |
| 6,591,276 B1 * | 7/2003 | Dockter et al. | 707/103 R |
| 6,601,234 B1 * | 7/2003 | Bowman-Amuah | 717/108 |
| 6,658,652 B1 * | 12/2003 | Alexander et al. | 717/128 |
| 6,662,191 B1 * | 12/2003 | Cherniavsky et al. | 707/103 X |
| 6,674,904 B1 * | 1/2004 | McQueen | 382/199 |
| 6,678,691 B1 * | 1/2004 | Kikkers | 707/102 |
| 6,687,707 B1 * | 2/2004 | Shorter | 707/103 R |
| 6,706,314 B2 * | 3/2004 | Butland | 427/7 |
| 6,707,380 B2 * | 3/2004 | Maloney | 340/568.1 |
| 6,727,817 B2 * | 4/2004 | Maloney | 340/572.8 |
| 6,782,532 B1 * | 8/2004 | Sexton et al. | 717/136 |
| 6,801,919 B2 * | 10/2004 | Hunt et al. | 707/202 |
| 6,802,447 B2 * | 10/2004 | Horng | 235/375 |
| 6,831,562 B2 * | 12/2004 | Rodgers et al. | 340/572.4 |
| 6,879,999 B2 * | 4/2005 | Elnozahy | 709/219 |
| 6,915,954 B2 * | 7/2005 | Knowles et al. | 235/462.01 |
| 6,918,123 B1 * | 7/2005 | Shteyn | 719/318 |
| 6,918,541 B2 * | 7/2005 | Knowles et al. | 235/462.01 |
| 6,925,646 B1 * | 8/2005 | Korenshtein et al. | 719/328 |
| 6,941,133 B2 * | 9/2005 | Jacobs et al. | 455/418 |
| 6,947,952 B1 * | 9/2005 | Welch et al. | 707/104.1 |
| 6,957,775 B2 * | 10/2005 | Tsikos et al. | 235/462.01 |
| 6,958,698 B2 * | 10/2005 | Maloney | 340/572.8 |
| 6,980,797 B1 * | 12/2005 | Tuulos | 455/411 |
| 6,982,646 B2 * | 1/2006 | Rodgers et al. | 340/572.7 |
| 7,005,661 B2 * | 2/2006 | Yamaguchi et al. | 250/559.16 |
| 7,024,434 B2 * | 4/2006 | Fuller et al. | 707/203 |
| 7,055,134 B2 * | 5/2006 | Schroeder | 717/120 |
| 7,069,540 B1 * | 6/2006 | Sievert | 717/120 |
| 7,089,561 B2 * | 8/2006 | Morrison et al. | 719/312 |
| 7,271,814 B2 * | 9/2007 | Anwar et al. | 345/629 |

OTHER PUBLICATIONS

Dictionary of Object Technology, Donald G. Firesmith et al, Sep. 22, 1995, pp. 422-424.*

Template Software, Developing a WFT Workflow System, 1998, p. 9-15.*

* cited by examiner

PROTECTING OBJECT IDENTITY IN A LANGUAGE WITH BUILT-IN SYNCHRONIZATION OBJECTS

FIELD OF THE INVENTION

The present invention relates generally to data processing systems and, more particularly, to protecting the identity of objects in a programming language that has built-in synchronization on objects.

BACKGROUND AND MATERIAL INFORMATION

In an object-oriented programming language, mathematical values and other literal data types are typically represented as objects. A literal is a value that is expressed as itself rather than as a variable's value or the result of an expression. For example, the number 5 is a literal of primitive data type Integer in the Java™ object-oriented programming language. Other primitive data types in the Java programming language include Boolean, Character, Byte, Short, Long, Float, and Double. Each of the primitive data types has a class wrapper around it that is useful when needed to manipulate literal types as objects. Accordingly, in the example above, the number 5 is an object of class Integer. The aforementioned classes are also immutable, which means that objects of these classes are not subject to changing fields. Therefore, the fields of the object 5 cannot be changed. The Java programming language also includes String as an immutable type, although it is not a primitive data type.

The identity of an object can often be detected in a variety of ways in object-oriented languages. For example, many object-oriented languages include an identity method that is implemented using an operator such as the "=" operator. The "=" operator determines whether two variables are identified with the same object. Another manner in which the identity of objects may be determined is by changing the fields of the objects. Field changing, however, is ineffective to determine the identity of objects when the objects are immutable.

Yet another method of determining the identity of objects exists in some object-oriented programming languages that enable multithreading, such as the Java programming language. Multithreaded languages provide support for multiple threads of execution, each handling a different task. The Java programming language, for example, may determine the identity of objects using the synchronized instruction. In particular, when a thread executes the synchronized statement to acquire an exclusive lock for an object, it does not access the object until it can obtain this lock, ensuring that no other threads can access the object at the same time. If a particular thread uses the synchronized statement to attempt to use one variable of an object, it can determine whether or not the object is locked. If the object is locked, then the variable is from the same object as another variable in use by another thread. If the object is not locked, then it can be determined that the variable in use by the other thread is not from the same object. The identity of the object, therefore, is determinable through use of the synchronized operation.

SUMMARY OF THE INVENTION

It is useful to protect the physical identity of objects to permit optimizations that involve aliasing in a manner that is semantically transparent. Accordingly, there is a need for a system and method for protecting the identity of objects in a programming language that has built-in synchronization on objects.

Methods and systems consistent with the principles of the invention enable protection of object identity in an object-oriented programming language. An object from a class for protecting object identity is instantiated in memory. The object is immediately locked in response to the instantiating, so that the identity of the locked object is protected from threads that attempt to synchronize on the locked object.

Other methods and systems consistent with the principles of the invention enable protection of object identity in an object-oriented programming language. An object from a class for protecting object identity is instantiated in memory. The object includes a first method that determines whether two object values are equal, and a second method that overrides an identity method associated with a superclass of the object by invoking the first method, the identity method for determining the identity of two objects. The object is immediately locked in response to the instantiating, so that the identity of the locked object is protected from threads that attempt to synchronize on the locked object.

Other methods and systems consistent with the principles of the invention also enable protection of object identity in an object-oriented programming language. A virtual machine receives code including an identity operator and then invokes an identity method associated with the identity operator. A first method is performed based on a determination that the identity method is associated with an object from a first class, the first method for determining whether two object values are substantially equal. An identity function is performed based on a determination that the identity method is not associated with an object from the first class, the identity function for determining whether two object references refer to the same object.

Other methods and systems consistent with the principles of the invention also enable protection of object identity in an object-oriented programming language. An object from a class for protecting object identity in an object-oriented programming language includes a first method that determines whether two object values are equal. The object also includes a second method that overrides an identity method associated with a superclass of the object by invoking the first method, the identity method for determining the identity of two objects.

Other methods and systems consistent with the principles of the invention also enable protection of object identity in an object-oriented programming language. A class hierarchy for protecting object identity includes three classes. A first class includes a first identity method configured to determine identity of two objects. A second class includes a second identity method and an equals method for determining whether two object values are equal, the second identity method overriding the first identity method by invoking the equals method, wherein the second class is a direct abstract subclass of the first class. A third class inherits the second identity method from the second class and is a subclass of the second class. An object from the third class is locked upon instantiation in memory so that the identity of the locked object is protected from threads that attempt to synchronize on the locked object.

BRIEF DESCRIPTION OF THE DRAWINGS

The accompanying drawings are incorporated in and constitute a part of this specification and, together with the description, explain the features and principles of the invention. In the drawings.

DETAILED DESCRIPTION

The following detailed description of methods and systems consistent with the invention refers to the accompanying drawings. While the description includes exemplary implementations, other implementations are possible, and changes may be made to the implementations described without departing from the spirit and scope of the invention. The following detailed description does not limit the invention. Instead, the scope of the invention is defined by the appended claims and their equivalents.

Overview

Methods and systems consistent with the principles of the invention protect object identity in an object-oriented programming language. When an instance of an object of a particular class that complies with certain aspects of this invention is created, the new object is automatically locked in response to the instantiation. As a result, the identity of the locked object is protected from threads that attempt to synchronize on the object.

The object itself includes a first method that determines whether two object values are equal and a second method that overrides an identity method from a superclass of the object by calling the first method. The identity method determines the identity of two objects (e.g., determines whether two object references refer to the same object). Accordingly, attempts to determine the identity of the object using an identity method result in determining whether two object values are equal, not whether two object references refer to the same object.

Network Environment

Figure 1:
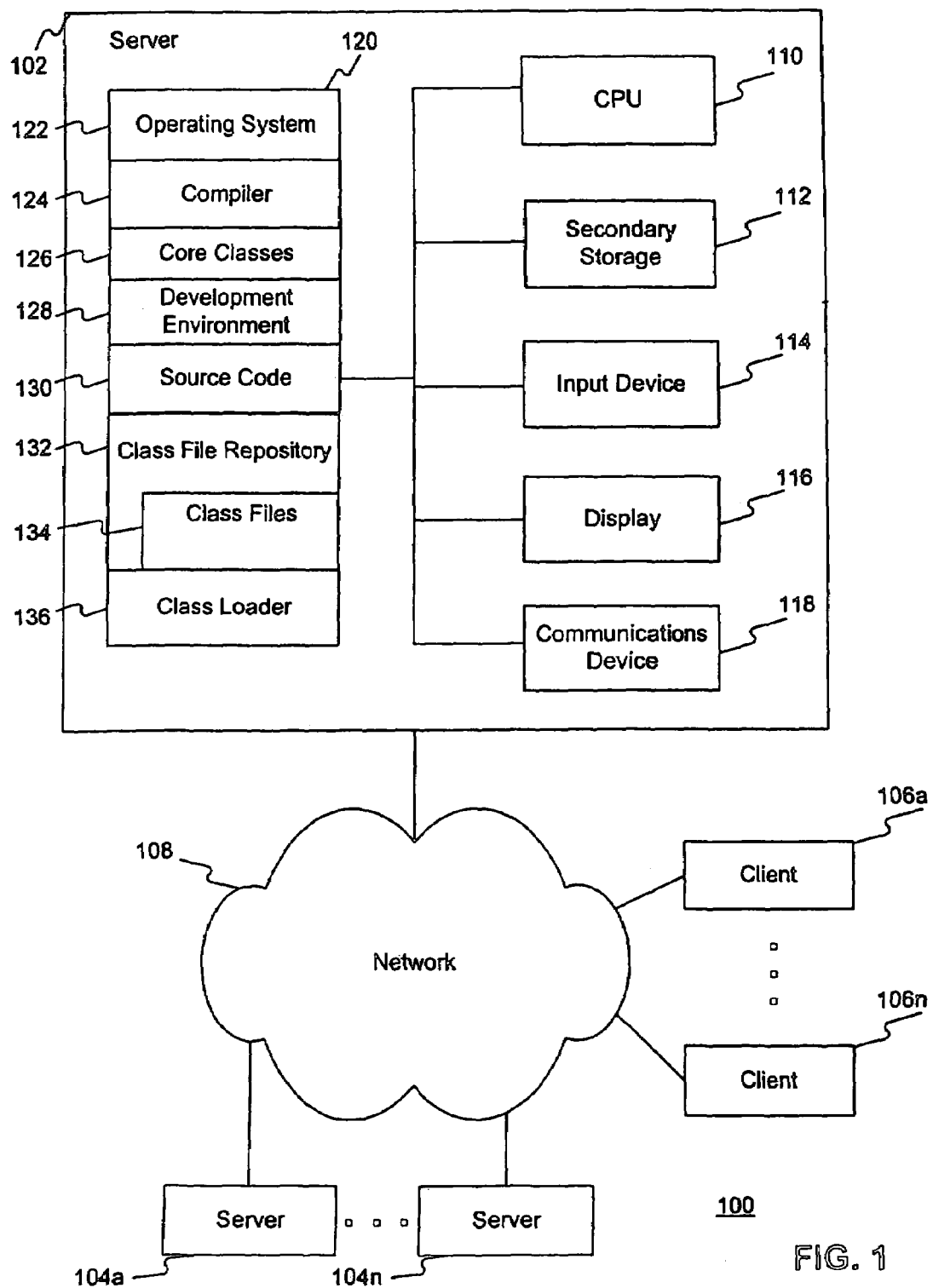
FIG. 1 is a diagram of an exemplary network environment in which features and aspects consistent with the present invention may be implemented.

FIG. 1 is a diagram of an exemplary network environment in which features and aspects consistent with the present invention may be implemented. Network environment 100 may include servers 102 and 104a-104n, clients 106a-106n, and network 108. The components of FIG. 1 may be implemented through hardware, software, and/or firmware. The number of components in network environment 100 is not limited to what is shown.

Servers 102 and 104a-104n supply clients 106a-106n with programs written in a programming language, such as the Java programming language. For example, a software developer may create one or more programs in the Java programming language and compile them into class files that contain bytecodes executable by a virtual machine, such as the Java™ virtual machine. When a client, such as client 106a, wishes to execute a program written in the Java programming language, it may issue a request to a server, such as server 102, that contains the program. In response, server 102 transmits the corresponding class files to client 106a via a communication channel, such as network 108 (which may comprise a wired or wireless communication network, including the Internet). Client 106a may load the class files into a virtual machine located in client 106a and proceed to execute the program written in the Java programming language. Alternatively, a client may receive a program, such as a program written in the Java programming language, from another client instead of a server.

Server 102 may include CPU 110, secondary storage 112, input device 114, display 116, communications device 118, and memory 120. Memory 120 may include operating system 122, compiler 124, core classes 126, development environment 128, source code 130, class file repository 132, which includes class files 134, and class loader 136. Servers 104a-104n may contain components similar to those in server 102.

Compiler 124 translates source code into class files that contain bytecodes executable by a virtual machine or abstract processor. Core classes 126 may be a set of classes, such as a library of classes written in the Java programming language, that can be referenced by source files, such as source code 130, containing other/new classes written in the Java programming language. Core classes 126 and/or source code 130 may define special value classes and constant classes that make it possible to protect the identity of objects, such as primitive data type objects. Development environment 128 may provide a mechanism, such as an editor, for generating source files, such as source code 130. Source code 130 may be files containing code written in the Java programming language. Class file repository 132 includes class files 134. Class files 134 are bytecodes executable by a virtual machine and contain data representing a particular class, including data structures, method implementations, and references to other classes. Class loader 136 loads classes onto a client.

Figure 2:
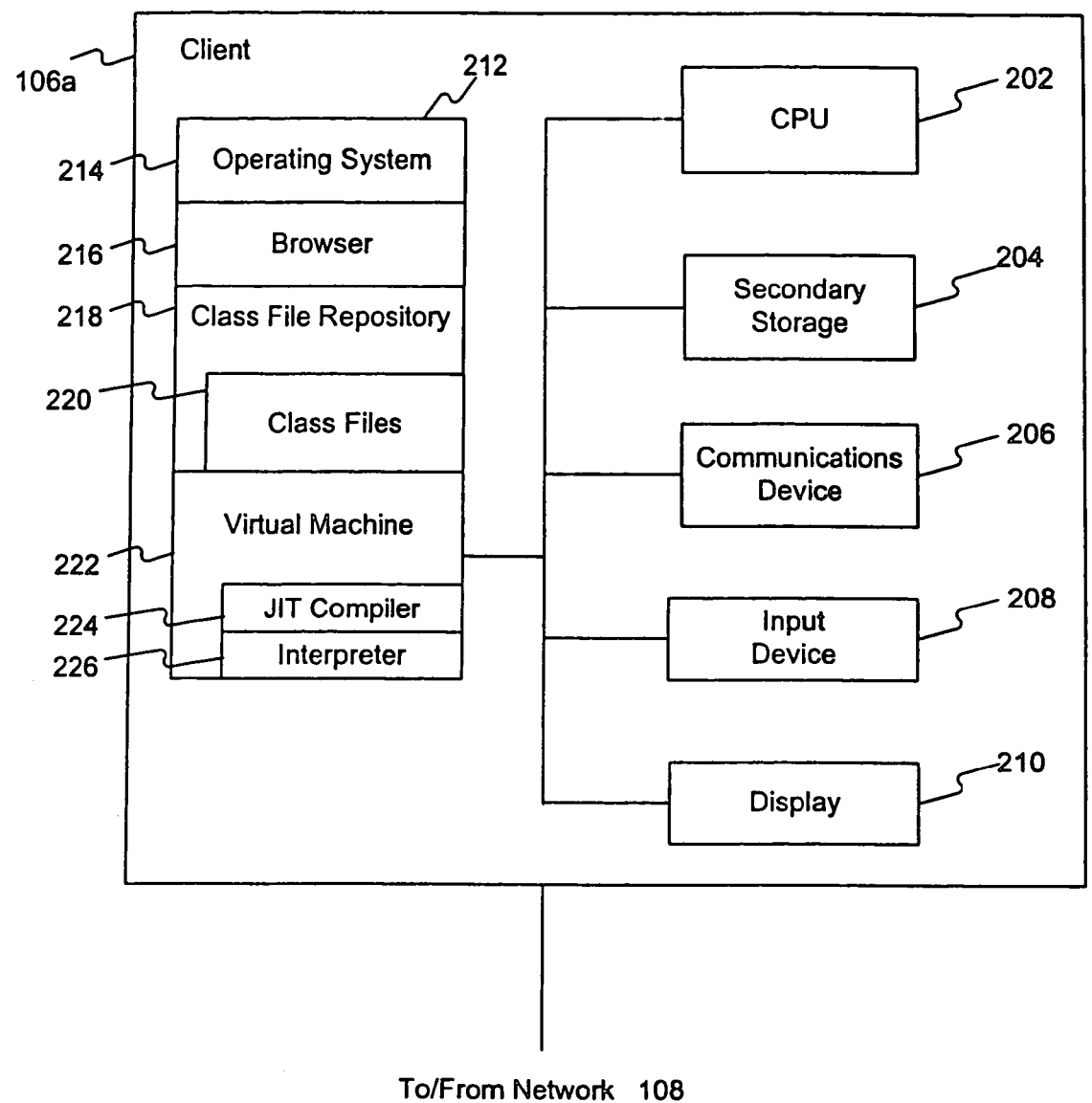
FIG. 2 is a diagram of a client consistent with the present invention.

FIG. 2 is a diagram of client 106a in greater detail, although the other clients 106b-106n may contain similar components. Client 106a may include CPU 202, secondary storage 204, communications device 206, input device 208, display 210, and memory 212. Memory 212 may include operating system 214, browser 216, class file repository 218, and virtual machine 222.

When a user of client 106a wishes to execute a program stored on a server, such as server 102, the user may use browser 216 to issue a request to server 102, using known client-server communication protocols such as TCP/IP (Transmission Control Protocol/Internet Protocol). In response, server 102 transmits the corresponding class files to client 106a via network 108. For example, class files from server 102 may be stored either temporarily or on a more permanent basis in class file repository 218. Client 106a may load the class files into a virtual machine, such as virtual machine 222, located in client 106a and proceed to execute the program. Class 106a may also receive class files from another client.

Class file repository 218 includes class files 220. Class files 220 may include both preloaded class files and dynamically loaded class files. Preloaded class files are those class files that are loaded onto client 106a prior to runtime. Dynamically loaded class files are those class files that are dynamically loaded at runtime.

Virtual machine 222 includes JIT compiler 224 and interpreter 226 and is operable to execute class files. In one implementation, virtual machine 222 is a Java virtual machine. One of ordinary skill in the art will recognize that other types of virtual machines may be used. Virtual machine 222 may utilize both JIT compiler 224 and interpreter 226 to execute class files. JIT compiler 224 is a compiler running as part of virtual machine 222 that dynamically compiles bytecode to platform-dependent machine code just before a method is first executed. Interpreter 226 interprets class files without compilation to platform-dependent machine code.

Figure 3:
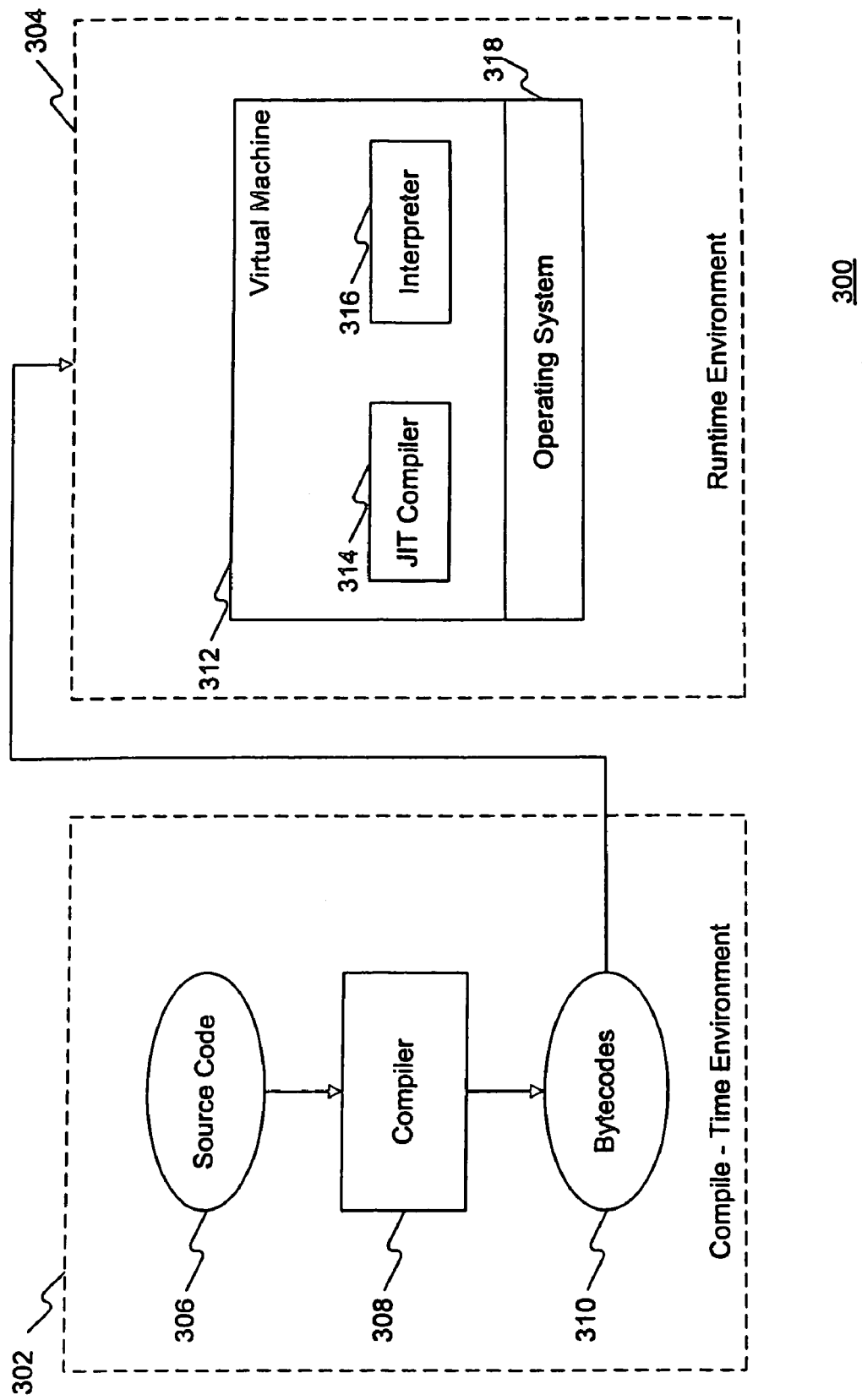
FIG. 3 is a diagram showing the dataflow involved in executing a program using a virtual machine.

FIG. 3 is a diagram showing the dataflow involved in executing a program using a virtual machine. In the diagram depicted in FIG. 3, virtual machine 312 located in runtime environment 304, such as the Java™ runtime environment, executes a program initially located in compile-time environment 302. Source code 306, which may be a program written in the Java programming language, is provided to compiler 308. Compiler 308 translates source code 306 into bytecodes 310 executable by a virtual machine. Bytecodes 310 may be reproduced, downloaded, or otherwise distributed to a user at runtime environment 304. In the runtime environment 304, virtual machine 312 may execute bytecodes 310 by first downloading or otherwise acquiring bytecodes 310 and then executing them. JIT compiler 314, interpreter 316, services from the underlying operating system 318, and the computer hardware (not shown) aid in the execution of the bytecodes 310.

Protecting Object Identity

Figure 4:
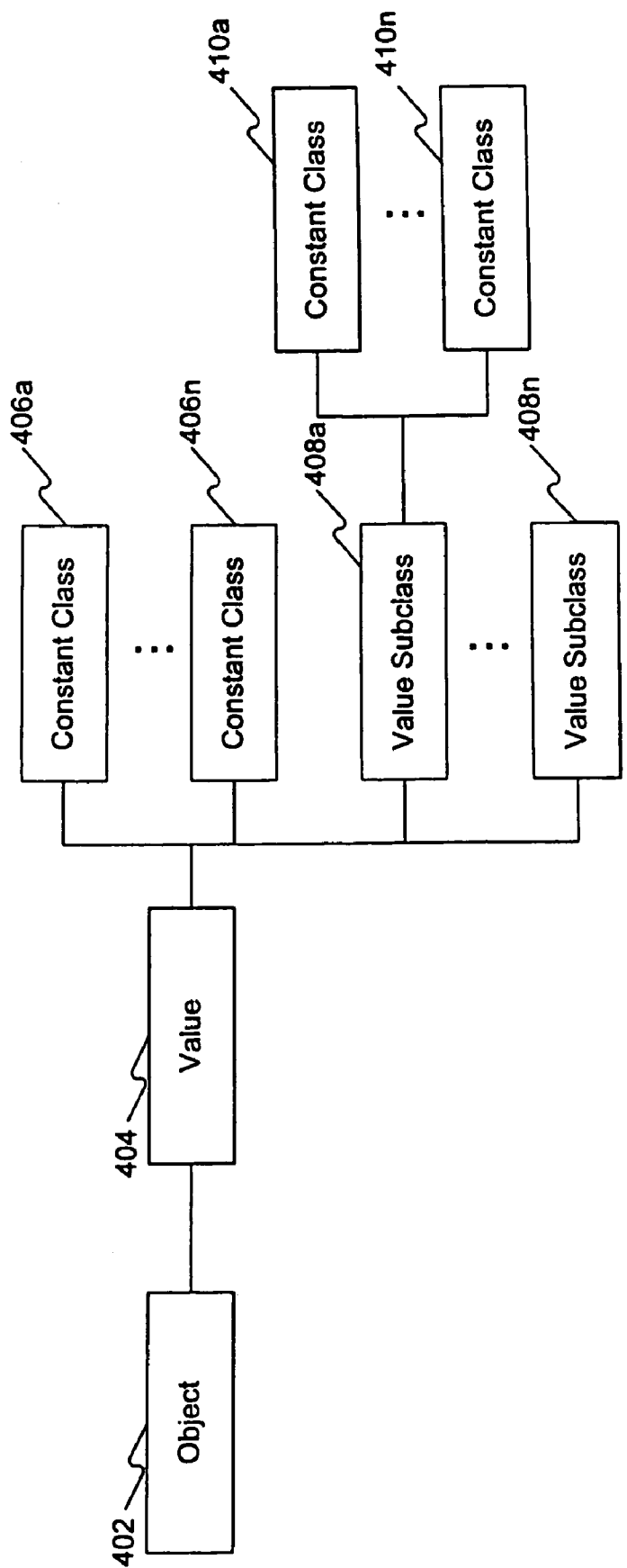
FIG. 4 is a diagram showing a class hierarchy consistent with the present invention.

FIG. 4 is a block diagram showing a class hierarchy consistent with the present invention. The class hierarchy of FIG. 4 may be implemented in the Java programming language or another programming language. For example, the class hierarchy may be part of the java.lang package, which contains the classes that are most central to the Java programming language. The java.lang package may be a part of core classes 126. Alternatively, the class hierarchy need not be entirely from core classes 126. Some of the class hierarchy, such as value class 404, constant classes 406a-406n, and constant class 410a-410n, may originate from source code.

Object class 402 is the root class (e.g., at the top of the class hierarchy) in the Java programming language. Accordingly, all classes are subclasses of Object class 402, either directly or indirectly, and therefore inherit the methods of Object class 402. These methods may include equals ( ), hashcode( ), and =. Equals( ) tests whether two objects two objects have the same value, not whether two references refer to the same object. Hashcode( ) returns a hash code for a specified object within the parentheses "( )". The default implementation returns a value that is usually unique for different objects. The "=" method tests whether two variables refer to the same object, not whether two objects contain the same values.

Value class 404 is a direct abstract subclass of object class 402. An abstract class is a class that is used to define common behavior for an intended set of subclasses, such as constant classes 406a-406n. In other words, the abstract class includes whatever features each of the intended set of subclasses have in common. Using abstract classes, one can declare classes that define part of an implementation, leaving extended classes to provide specific implementation of some or all of the methods. In one implementation, abstract classes are incomplete and cannot be instantiated in terms of objects. A subclass of an abstract class, however, may be instantiated if it overrides each of the abstract methods of its superclass and provides an implementation (i.e., a method body) for all of them.

Value class 404 includes an equals( ) method, a hashcode( ) method, and a "final" version of a = method that overrides the = method of object class 402. The equals ( ) method and the hashcode( ) method may be abstract methods.

The final version of the = method calls the equals( ) method of value class 404. As such, whenever somebody tries to use the = operator in conjunction with an object from a subclass of value class 404, the equals( ) method is called. Because the = method of value class 404 is final, it cannot be overridden. A method in a class is overridden, for example, when a subclass of the class defines a method using the same name, return type, and arguments as the method in the class. When the method is invoked for an object of the subclass, it is the new definition of the method that is called, not the class' old definition.

Constant classes 406a-406n are direct subclasses of value class 404. Accordingly, constant classes 406a-406n inherit the methods of value class 404, including the = method. Also, constant classes 406a-406n override and provide an implementation for each of the abstract methods of value class 404, including equals( ) and hashcode( ). Because constant classes 406a-406n provide a specific implementation of all of their methods, constant classes 406a-406n may be instantiated. Objects whose identities need to remain protected may be instantiated as a constant class object. For example, objects representing mathematical values and other literal data types that need to have their physical identity protected may be designated as type constant class. In one implementation, each constant class 406 may refer to a different literal data type. Accordingly, constant class 406a may be named, for example, "integer_constant" and be used when an integer's identity is to be protected. Constant class 406b may be named "float_constant" and be used when a floating point number's identity is to be protected, and so on. Therefore, each of constant class 406a-406n may have different characteristics as long as each has the aforementioned methods inherited from value class 404.

When a constant class object is instantiated, a special system thread immediately locks the object. This results in all instances of constant classes always being locked. It is legal to try to synchronize on a constant class object, but because the object is always locked, the attempt does not succeed. All instance fields of a constant class are final. Constants classes 410a-410n are indirect subclasses of value class 404 and operate in a manner similar to that of constant classes 406a-406n. Value subclasses 408a-408n demonstrate that constant classes do not necessarily have to be direct subclasses of the value class.

Figure 5:
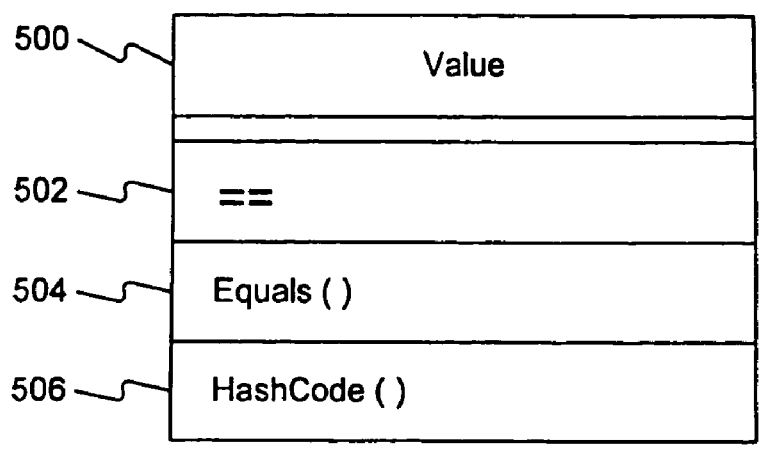
FIG. 5 is an exemplary diagram of a value class consistent with the present invention.

FIG. 5 is an exemplary diagram of a value class consistent with the present invention.

Figure 6:
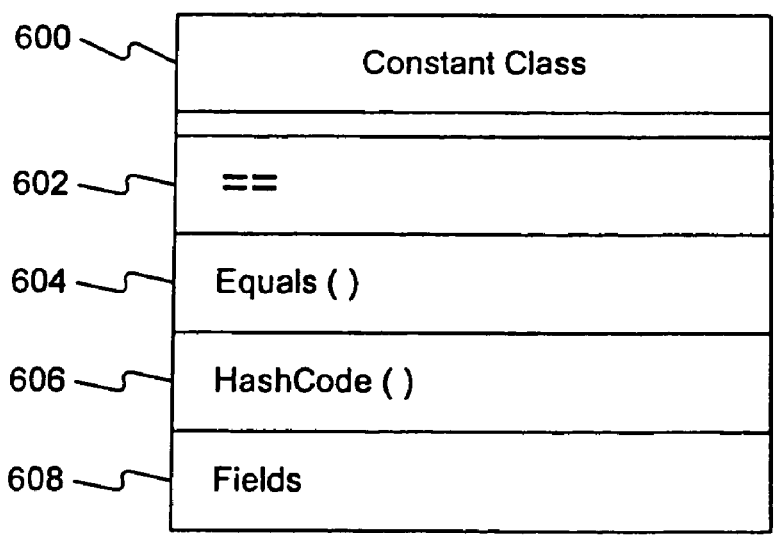
FIG. 6 is an exemplary diagram of a constant class consistent with the present invention.

The contents of a value class is not limited to what is shown. Value class 500 may include = method 502, equals ( ) method 504, and hashcode( ) method 506, as previously explained with reference to FIG. 4 above. The = method 502 is a final method that overrides the = method of the object class, invoking equals( ) 504 instead. FIG. 6 is an exemplary diagram of a constant class consistent with the present invention. The contents of a constant class is not limited to what is shown. Constant class 600 may include = method 602, equals ( ) method 604, hashcode( ) method 606, and fields 608, as previously explained with reference to FIG. 4 above.

The = method 602 is inherited from value class 500 and operates in the same manner. Equals( ) 604 and hashcode( ) 606 override the similarly named methods of value class 500, but they operate in a similar manner. Fields 608 are data belonging to constant class 600. Fields 608 of instances of constant class are final.

Figure 7:
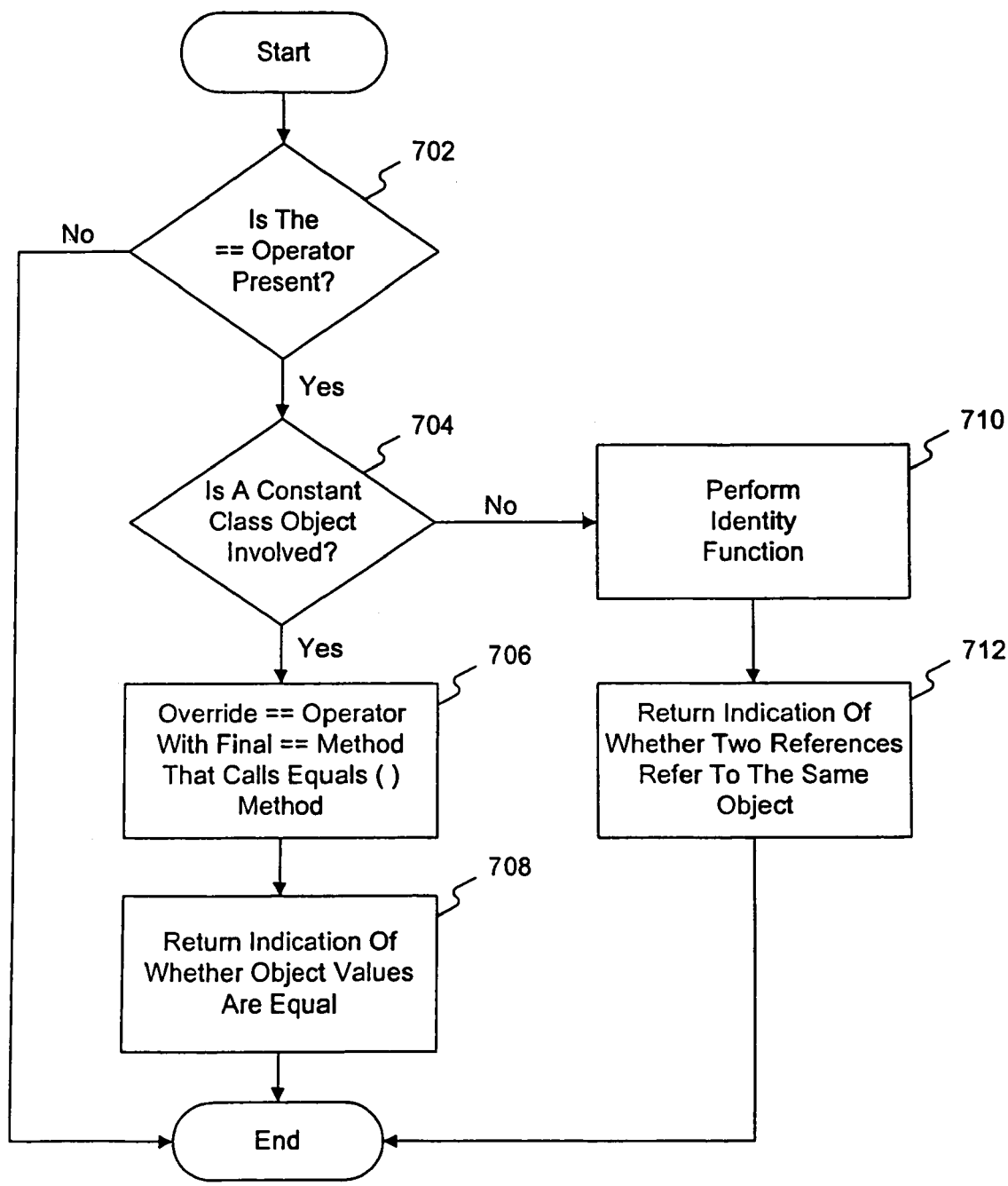
FIG. 7 is an exemplary flowchart of a method for protecting object identity consistent with the present invention.

FIG. 7 is an exemplary flowchart of a method for protecting object identity consistent with the present invention. Although the steps of the flow chart are described in a particular order, one skilled in the art will appreciate that these steps may be performed in a different order, or that some of these steps may be concurrent. The steps of FIG. 7 may be performed, for example, during the execution of a program by a virtual machine.

First, a determination is made as to whether the particular code being interpreted or compiled by a JIT compiler has the = operator present (step 702). If not, then execution continues as normal. If the = operator is present, then the virtual machine makes a determination as to whether a constant class object is involved (step 704). For example, the virtual machine may invoke the = method of the object instance whose identity is desired. The corresponding = method performs its steps. If the = method is from a constant class object, then the method is a final method that overrides the = method from the object class and invokes the equals( ) method of the constant class object (step 706). Invoking the equals( ) method has the effect of making a determination whether the value of the two objects referenced in conjunction with the = operator are the same. A true indication is returned if the objects have the same value, and a false indication is returned if the objects do not have the same value (step 708). In this manner, when an attempt is made to determine whether a constant class object refers to the same object as another object, an indication of whether the object values are the same is returned, instead of an indication of object identity.

If the = method is not from a constant class object, then the virtual machine performs the identity function (step 710). Execution of the identity function results in the return of an indication whether two variable references refer to the same object (step 712).

Figure 8:
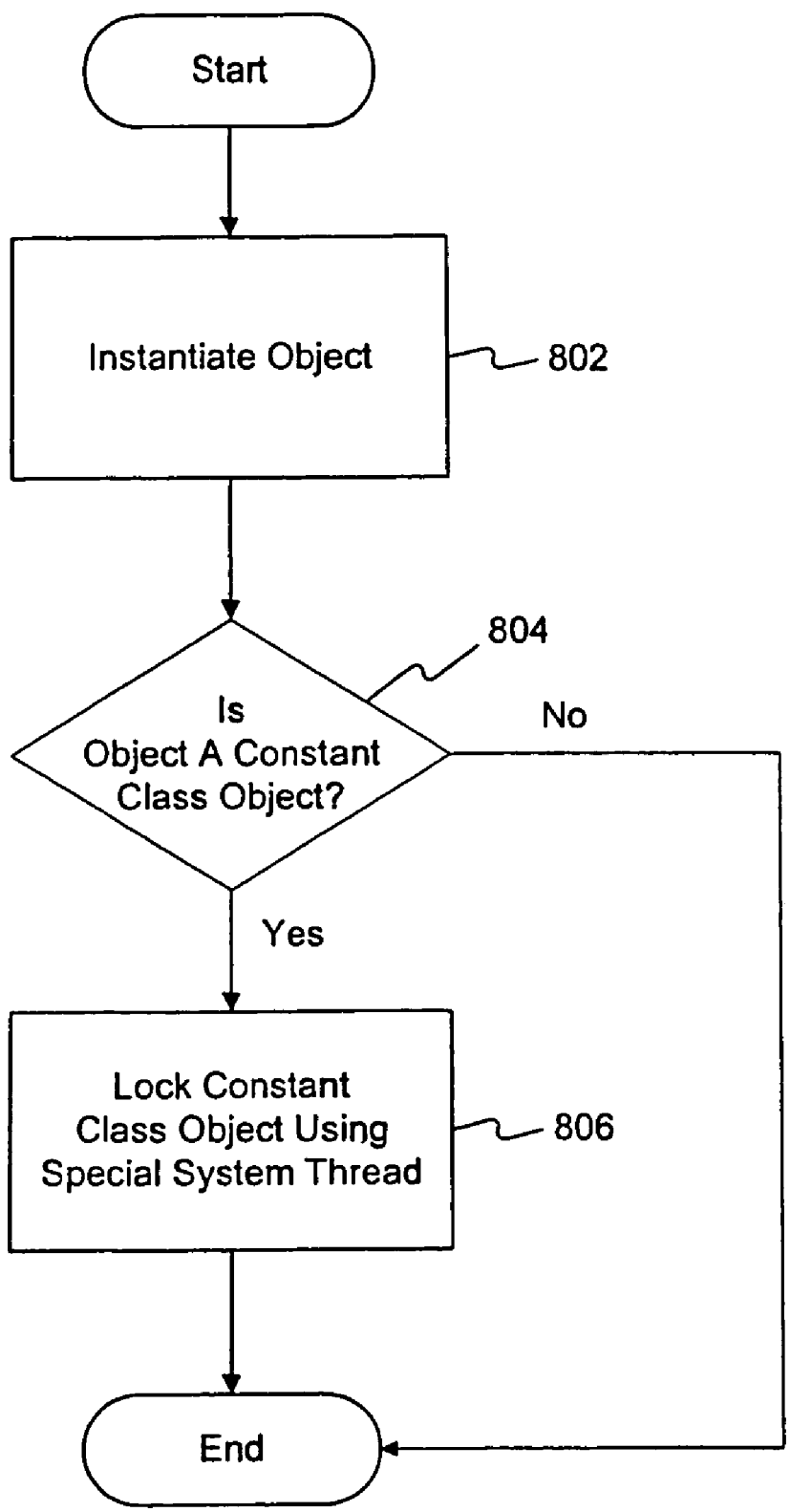
FIG. 8 is an exemplary flowchart of another method for protecting object identity consistent with the present invention.

FIG. 8 is an exemplary flowchart of another method for protecting object identity consistent with the present invention. Although the steps of the flow chart are described in a particular order, one skilled in the art will appreciate that these steps may be performed in a different order, or that some of these steps may be concurrent. The steps of FIG. 8 may be performed, for example, during the execution of a program by a virtual machine.

A virtual machine executing a program, such as a program written in the Java programming language, may instantiate an object in memory when instructed to do so (step 802). Next, the virtual machine determines whether the newly instantiated object is a constant class object (step 804). If the instantiated object is not a constant class object, then execution continues as normal. If the instantiated object is a constant class object, then the virtual machine proceeds to lock the constant class object using a special system thread (step 806). For example, the virtual machine may cause a special system thread to change one or more bits in the header of the constant class object, indicating that the object is locked. The special system thread is a thread created and controlled by the virtual machine that does not run any user code. Consequently, user code cannot synchronize on the constant class object instance, and it is not possible to determine constant class object identity using a synchronize operation.

Figure 9:
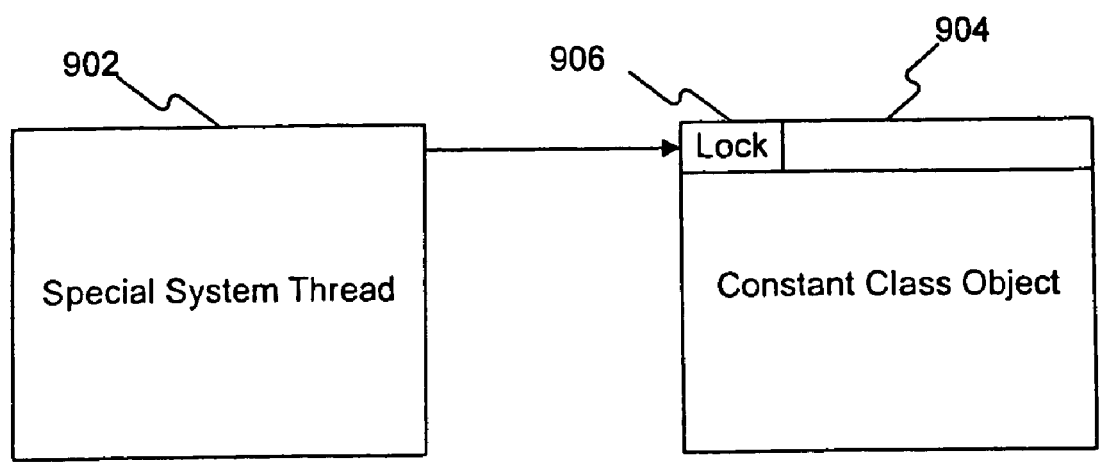
FIG. 9 is a diagram of the interaction between a special system thread and a constant class object.

FIG. 9 is a diagram of the interaction between a special system thread and a constant class object. As explained above with reference to FIG. 8, once a constant class object 904 has been instantiated in memory, a virtual machine nearly simultaneously causes a special system thread 902 to lock constant class object 904. Specifically, special system thread 902 changes one or more bits, such as lock 906, in the header of constant class object 904 in order to lock the object. User code attempting to synchronize on constant class object 904 finds that the object is locked, effectively protecting the identity of constant class object 904.

Figure 10:
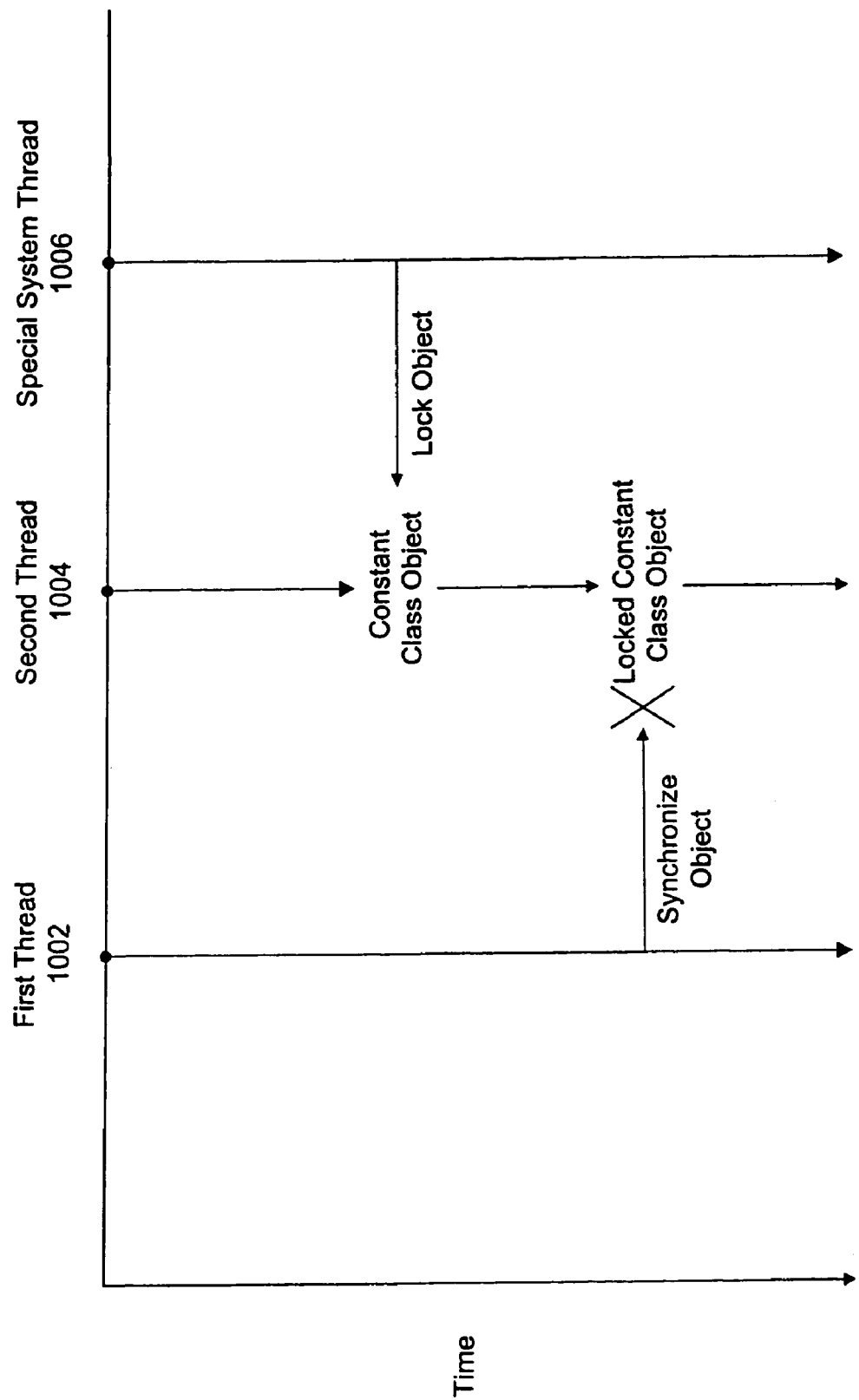
FIG. 10 is a diagram of the interaction between multiple threads and a constant class object.

FIG. 10 is a diagram of the interaction between multiple threads and a constant class object. A second thread 1004 instantiates a constant class object in memory. The instantiation triggers special system thread 1006 to immediately lock the constant class object. Thereafter, a first thread 1002 that tries to synchronize on the constant class object cannot do so, because the object is locked.

While the present invention has been described in connection with various embodiments, many modifications will be readily apparent to those skilled in the art. Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave, optical signal or digital signal from a network, such as the Internet; or other forms of RAM or ROM either currently known or later developed. Additionally, although a number of the software components are described as being located on the same machine, one skilled in the art will appreciate that these components may be distributed over a number of machines. The invention, therefore, is not limited to the disclosure herein, but is intended to cover any adaptations or variations thereof.

What is claimed is:

1. A process for protecting object identity in an object-oriented programming language, comprising:
    instantiating an object from a first class in memory; and
    locking the object in response to the instantiating, wherein the identity of the locked object is protected from threads that attempt to synchronize on the locked object, and wherein each object from the first class is automatically locked when that object is instantiated.

2. The process of claim 1, wherein the object includes a first method that determines whether two object values are equal, and a second method that overrides an identity method associated with a superclass of the object by invoking the first method, the identity method for determining the identity of two objects.

3. The process of claim 2, wherein the second method is a final method.

4. The process of claim 1, the locking comprising:
    setting a bit in a header of the object using a thread.

5. The process of claim 4, wherein the thread that changes the bit is a system thread that does not run user code.

6. A process for protecting object identity in an object-oriented programming language, comprising:
    instantiating an object from a first class in memory, the object including a first method that determines whether two object values are equal, and a second method that overrides an identity method associated with a superclass of the object by invoking the first method, the identity method for determining the identity of two objects; and
    locking the object in response to the instantiating, wherein the identity of the locked object is protected from threads that attempt to synchronize on the locked object, and wherein each object from the first class is automatically locked when that object is instantiated.

7. The process of claim 6, wherein the second method is a final method.

8. The process of claim 6, wherein the object includes a third method that returns a hash code for a given object.

9. The process of claim 6, the locking comprising:
    changing a bit in a header of the object using a thread.

10. The process of claim 9, wherein the thread that changes the bit is a system thread that does not run user code.

11. A process for protecting object identity in an object-oriented programming language, comprising:
   receiving code including an identity operator;
   invoking an identity method associated with the identity operator;
   performing a first method, instead of the identity method, based on a determination that the identity method is associated with an object from a first class, the first method for determining whether two object values are equal; and
   performing an identity function based on a determination that the identity method is not associated with an object from the first class, the identity function for determining whether two object references refer to the same object.

12. The process of claim 11, wherein the identity method associated with the object from the first class is a final method that invokes the first method.

13. The process of claim 11, wherein the object from the first class is locked upon instantiation so that the identity of the locked object is protected from threads that attempt to synchronize on the locked object.

14. An object from a class for protecting object identity in an object-oriented programming language, comprising:
   a first method that determines whether two object values are equal; and
   a second method that overrides an identity method associated with a superclass of the object by invoking the first method, the identity method for determining the identity of two objects.

15. The object of claim 14, wherein the second method is a final method.

16. The object of claim 14, further comprising:
   a third method that returns a hash code for a given object.

17. The object of claim 14, wherein all fields of the object are final.

18. The object of claim 14, wherein the object is locked by a thread upon instantiation, so that the identity of the object is indeterminable.

19. A class hierarchy for protecting object identity in an object-oriented programming language, comprising:
   a first class including a first identity method configured to determine identity of two objects;
   a second class including a second identity method and an equals method for determining whether two object values are equal, the second identity method overriding the first identity method by invoking the equals method, wherein the second class is a direct abstract subclass of the first class; and
   a third class that inherits the second identity method from the second class, wherein the third class is a subclass of the second class and an object from the third class is locked upon instantiation in memory so that the identity of the locked object is protected from threads that attempt to synchronize on the locked object, and wherein each object from the third class is automatically locked when that object is instantiated.

20. The class hierarchy of claim 19, wherein the second identity method is a final method.

21. The class hierarchy of claim 19, wherein the locking thread is a system thread that does not run user code.

22. An object from a class for protecting object identity in an object-oriented programming language, comprising:
   a first method that determines whether two object values are equal; and
   a second method that overrides an identity method associated with a superclass of the object by invoking the first method, the identity method for determining the identity of two objects,
   wherein the object is locked upon instantiation so that threads fail when attempting to synchronize on the locked object, and wherein each object from the class is automatically locked when that object is instantiated.

23. The object of claim 22, wherein the second method is a final method.

24. The object of claim 22, further comprising:
   a third method that returns a hash code for a given object.

25. The object of claim 22, wherein all fields of the object are final.

26. An apparatus for protecting object identity in an object-oriented programming language, comprising:
   means for instantiating an object from a first class in memory; and
   means for locking the object in response to the instantiating, wherein the identity of the locked object is protected from threads that attempt to synchronize on the locked object, and wherein each object from the first class is automatically locked when that object is instantiated.

27. The apparatus of claim 26, wherein the object includes a first method that determines whether two object values are equal, and a second method that overrides an identity method associated with a superclass of the object by invoking the first method, the identity method for determining the identity of two objects.

28. The apparatus of claim 27, wherein the second method is a final method.

29. The apparatus of claim 27, said means for locking comprising:
   means for changing a bit in a header of the object using a thread.

30. The apparatus of claim 29, wherein the thread that changes the bit is a system thread that does not run user code.

31. An apparatus for protecting object identity in an object-oriented programming language, comprising:
   means for instantiating an object from a first class in memory, the object including a first method that determines whether two object values are equal, and a second method that overrides an identity method associated with a superclass of the object by invoking the first method, the identity method for determining the identity of two objects; and
   means for locking the object in response to the instantiating, wherein the identity of the locked object is protected from threads that attempt to synchronize on the locked object, and wherein each object from the first class is automatically locked when that object is instantiated.

32. The apparatus of claim 31, wherein the second method is a final method.

33. The apparatus of claim 31, wherein the object includes a third method that returns a hash code for a given object.

34. An apparatus for protecting object identity in an object-oriented programming language, comprising:
   means for receiving code including an identity operator;
   means for invoking an identity method associated with the identity operator;
   means for performing a first method, instead of the identity method, based on a determination that the identity method is associated with an object from a first class, the first method for determining whether two object values are equal; and
   means for performing an identity function based on a determination that the identity method is not associated with an object from the first class, the identity function for determining whether two object references refer to the same object.

35. The apparatus of claim 34, wherein the identity method associated with the object from the first class is a final method that invokes the first method.

36. The apparatus of claim 34, wherein the object from the first class is locked using a thread upon instantiation in memory so that the identity of the locked object is protected from threads that attempt to synchronize on the locked object.

37. A computer-readable medium containing instructions for performing a process for protecting object identity in an object-oriented programming language, the process comprising:
instantiating an object from a first class in memory, the object including a first method that determines whether two object values are equal, and a second method that overrides an identity method from a superclass of the object by invoking the first method, the identity method for determining the identity of two objects; and
locking the object in response to the instantiating, wherein the identity of the locked object is protected from threads that attempt to synchronize on the locked object, and wherein each object from the first class is automatically locked when that object is instantiated.

38. The computer-readable medium of claim 37, wherein the second method is a final method.

39. The computer-readable medium of claim 37, wherein the object includes a third method that returns a hash code for a given object.

40. The computer-readable medium of claim 37, the locking comprising:
changing a bit in a header of the object using a thread.

41. The computer-readable medium of claim 40, wherein the thread that changes the bit is a system thread that does not run user code.

42. An apparatus for protecting object identity in an object-oriented programming language, comprising:
a memory having a program that: instantiates an object from a first class in memory, the object including a first method that determines whether two object values are equal, and a second method that overrides an identity method associated with a superclass of the object by invoking the first method, the identity method for determining the identity of two objects; and locking the object in response to the instantiating, wherein the identity of the locked object is protected from threads that attempt to synchronize on the locked object, and wherein each object from the first class is automatically locked when that object is instantiated; and
a processor that runs the program.

43. An apparatus for protecting object identity in an object-oriented programming language, comprising:
a memory having a program that: invokes an identity method associated with an identity operator; performs a first method, instead of the identity method, based on a determination that the identity method is associated with an object from a first class, the first method for determining whether two object values are equal; and performs an identity function based on a determination that the identity method is not associated with an object from the first class, the identity function for determining whether two object references refer to the same object; and
a processor that runs the program.

* * * * *